No. 816,026. PATENTED MAR. 27, 1906.
A. J. MEIER.
SURGICAL CLIP.
APPLICATION FILED MAR. 9, 1905.

Witnesses:

Inventor:
Albert J. Meier,
by Carr & Carr
attys

UNITED STATES PATENT OFFICE.

ALBERT J. MEIER, OF KIRKWOOD, MISSOURI.

SURGICAL CLIP.

No. 816,026.　　Specification of Letters Patent.　　Patented March 27, 1906.

Application filed March 9, 1905. Serial No. 249,200.

*To all whom it may concern:*

Be it known that I, ALBERT J. MEIER, a citizen of the United States, and a resident of Kirkwood, in the county of St. Louis and State of Missouri, have invented a new and useful Improvement in Surgical Clips, of which the following is a specification.

My invention relates to clips for use in holding the edges of wounds or surgical incisions in contact or apposition, so that they may join in healing.

It has for its principal objects to provide a clip which will lie close to the surface, and thus permit the application of a bandage without inconvenience to the patient; to provide a clip which will cover a very small portion of the wound, and hence will not prevent inspection of the entire surface of the wound; to provide a clip which can be rocked on its fastening-points, so as to raise the connecting-bar away from the wound to permit inspection or irrigation, and other objects hereinafter more fully appearing.

My invention consists in the parts and in the arrangements and combinations of parts hereinafter described and claimed.

Figure 1:
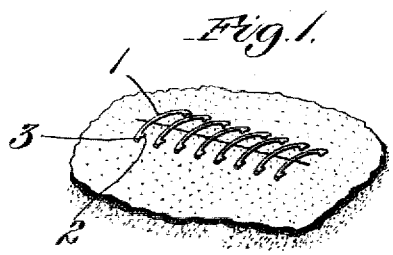
Figures 2, 3, 6, 7, 8, 9:
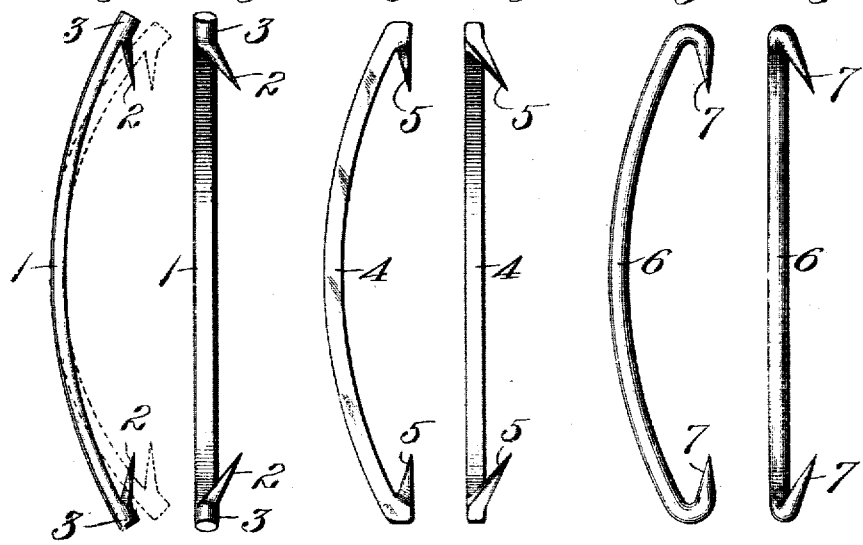
Figures 4, 5:
Figure 10:
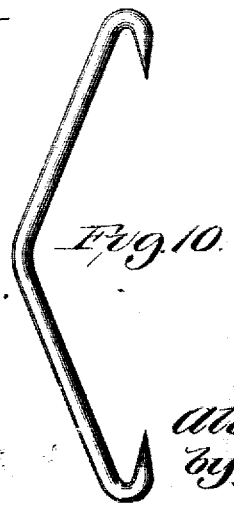

In the accompanying drawings, forming a part of this specification, and wherein like symbols refer to like parts wherever they occur, Figure 1 is a perspective view of a wound closed by clips. Fig. 2 is a plan view. Fig. 3 is a side view, and Fig. 4 an end view, of the preferred form of clip. Fig. 5 is a transverse sectional view through the preferred form of clip, showing it turned up away from the surface of the wound. Figs. 6 and 7 are plan and side views, respectively, of a modified form of clip which may be stamped out. Figs. 8 and 9 are plan and side views, respectively, of a modified form of clip which may be bent into shape; and Fig. 10 is a clip similar to that shown in Figs. 8 and 9, but having an angular bar.

The surgical clips herein disclosed are intended to be used to hold the sides of incisions or wounds together instead of stitches.

The preferred form of clip comprises a curved bar 1, which is provided at its ends with barbs 2. The barbs are formed by making sloping incisions in the bar, the displaced pieces forming the barbs. The barbs preferably project downwardly from the plane of the bar and slightly forwardly from a line joining their roots. This latter inclination is given them because the bar will be bent into the position shown in dotted lines in Fig. 2 when applied. The inclination is such that the barbs will be brought into the same vertical plane when the clip is in place on a wound. The barbs are not formed directly at the ends of the bar, but are formed short of the end, thus leaving short shoulders or stops 3. These stops will prevent the possibility of burying the ends of the clip in the flesh when forcing in the barbs.

The clip when in place lies flat and close to the surface of the skin. It is small, and a bandage can be bound over it tightly without the production of painful pressure under the clip. The area of the incision or wound covered by the bar is very small and practically hides none of it. When it is desired to irrigate the wound, the clip can be rocked on its points, as shown in Fig. 5, thus leaving sufficient space between the bar and the surface. This is accomplished without any danger of or necessity for removing the clip or permitting the wound to spread. The barbs can be inserted to a depth equal only to their length, the shoulders 3 preventing the burying of the ends of the clip in the flesh.

A satisfactory clip may be made by stamping, and such a clip is shown in Figs. 6 and 7. It comprises a curved bar 4, which is substantially rectangular in cross-section. Pointed barbs 5 are formed on the ends of the bar and occupy substantially the same position with respect to the bar as the barbs 2 on the bar 1 of the preferred form of clip.

Another modification may be made by bending, such a modification being shown in Figs. 8 and 9. The clip is made from wire bent into an arc to form a curved bar 6 and having its ends pointed and bent sharply to form barbs 7, occupying substantially the same position with respect to the bar as the barbs 2 on the bar 1 of the preferred form of clip.

In none of the modifications is it necessary that the bar of the clip be curved. It may be angular, as shown in Fig. 10, or any other shape which will raise it away from the surface when the clip is rocked on its points or barbs.

Obviously my device is capable of modification within the scope of my invention, and therefore I do not wish to be limited to the specific construction shown and described.

What I claim as my invention, and desire to secure by Letters Patent, is—

1. A surgical clip comprising a bar deflected from a line connecting its ends and barbs on said bar near the ends thereof and projecting out of the plane of said bar and at an angle to said plane, both of said barbs projecting upon the same side of said plane.

2. A surgical clip comprising a bar provided with barbs near its ends, said bar being deflected from a line connecting the roots of said barbs, and said barbs being inclined away from the plane of said bar, whereby said bar may lie flat upon the surface to which the clip may be secured by said barbs and the clip may be rocked upon its barbs.

3. A surgical clip comprising a bar deflected from a line connecting its ends and having sloping incisions near its ends, the metal displaced from said incisions being inclined away from said bar and at an angle to the plane of said bar and constituting barbs, the cross-section of said bar being substantially uniform from end to end except where said incisions are located.

In testimony whereof I have signed my name to this specification, in the presence of two subscribing witnesses, this 7th day of March, 1905.

ALBERT J. MEIER.

Witnesses:
FRED. F. REISNER,
J. B. MEGOWN.